Patented June 2, 1953

2,640,782

UNITED STATES PATENT OFFICE 2,640,782

PRINTING INK CONTAINING A POLYMERIZED OLEFIN

Herman S. Bloch, Chicago, and Alfred E. Hoffman, Clarendon Hills, Ill., assignors to Universal Oil Products Company, Chicago, Ill., a corporation of Delaware No Drawing. Application December 10, 1949, Serial No. 132,424

8 Claims. (Cl. 106—28)

This invention relates to printing inks and particularly to inks of the oxidizing type containing a varnish vehicle which dries upon exposure to atmospheric oxygen to form a hard film especially adapted for use in typographic, lithographic and intaglio printing processes. More specifically, the invention concerns a printing ink of the oxidizing type in which the conventional unsaturated fatty acid glyceride drying oil component of the varnish is replaced in part by a hydrocarbon drying oil characterized as comprising a mixture of high molecular weight, highly unsaturated hydrocarbons formed by the low temperature copolymerization of an isomono-olefin and a conjugated dienic hydrocarbon in the presence of a specific polymerization catalyst, hereinafter referred to, said printing ink composition being capable of drying upon exposure to atmospheric oxygen to form a tack-free, hard, but flexible film.

Printing inks of the oxidizing type consist essentially of a vehicle of varnish which is usually a solution or a copolymerized mixture of a resin and a drying oil and one or more pigments suspended in the vehicle. The vehicle may also contain other components such as fatty acids, a wax, and sometimes a low boiling paint solvent such as a petroleum naphtha, particularly if the drying oil component and/or the drying oil-resin mixture is viscous and requires a fluid diluent to reduce the viscosity of the varnish and enhance its flow characteristics when subsequently composited into a printing ink.

One of the most important properties of the oil used in a printing ink is its ability to oxidize to a solid material. If an ink does not dry well, its use is limited to very absorbent papers such as machine finish papers. In order to be used on coated and supercalendered papers it must dry rapidly so that it will not smear or rub badly when in the bindery or during folding and creasing operations. One of the primary objects of this invention is to provide a printing ink formulation with improved drying speed and having the property of drying to an ink film of greater scratch and rub resistance. Other concomitant advantages are obtained through the use of the present hydrocarbon drying oil in a printing ink composition, as will be hereinafter noted.

As provided in the present invention, the use of the hydrocarbon drying oil having the composition herein specified and possessing a markedly higher viscosity than the usual glyceride drying oils in the preparation of the vehicle component of the printing ink composition permits economies in the bodying procedure necessary to attain the usual 8–14 poise material required for the ink. For example, linseed oil may be bodied from its naturally fluid state to the required 8–14 poise material by heating at about 300° C. for a number of hours. Reaction temperatures below about 300° C. measurably reduce the bodying rate and increase the bodying time to impractically long periods of reaction while operating temperatures appreciably higher than 300° C. cause some decomposition of the oil. The use of the present copolymer hydrocarbon oil, however, as blends of the same with linseed oil may be copolymerized or bodied at 300° C. in a matter of minutes or at much lower temperature (e. g. 170° C.) within a few hours. Indeed, the physical nature of the copolymer oil is such that in blends low in linseed oil (for example, 25% of the latter) no bodying of the mixture is usually necessary.

The printing ink composition provided in the present invention, containing a hydrocarbon drying oil as a principal component of the varnish vehicle, possesses a high degree of water tolerance which becomes an important and desirable characteristic in the ability of the ink to resist high press-room humidity. This factor may be further enhanced by incorporating a petroleum wax or beeswax into the composition in amounts of from about 0.5 to about 5% by weight of the ink composition.

One of the primary objects of this invention is to provide a superior printing ink composition of the type which dries by exposure to atmospheric oxygen, particularly for lithographic, typographic and intaglio printing processes, the improvements thereof comprising greater flow, faster drying, and greater rub and scratch resistance and penetration into the article being printed.

In one of its embodiments, the present invention relates to a printing ink composition comprising a vehicle and a pigment as major components thereof, said vehicle comprising a mixture of an unsaturated fatty acid glyceride drying oil and a hydrocarbon drying oil consisting of polyolefinic, high molecular weight hydrocarbons formed by the hydrogen fluoride catalyzed polymerization of an aliphatic isomono-olefin containing not more than about eight carbon atoms per molecule with an aliphatic conjugated diolefin containing not more than about eight carbon atoms per molecule, said polymerization being effected at such temperature and at such other reaction conditions as to form a liquid, highly unsaturated hydrocarbon material, rather than a solid copolymer product.

A more specific embodiment of the invention relates to a printing ink composition containing from about 20 to about 75 parts by weight of a varnish vehicle having a viscosity of from about 8 to about 14 poises at 20° C. consisting of a mixture of from about 10 to about 75 parts by weight of an unsaturated fatty acid ester drying oil and from about 90 to about 25 parts by weight of an aliphatic, poly-olefinic hydrocarbon drying oil having a molecular weight of from about 500 to about 5,000, containing from about 10 to about 80 double bonds per molecule and formed by the hydrogen fluoride catalyzed copolymerization of an isomono-olefin and a conjugated di-olefin at temperatures of from about −80° C. to about −20° C., said printing ink composition also containing from about 0.1 to about 1% of a metallic drier salt and from about 10% to about 40% by weight of a pigment composition.

Other embodiments of the invention relating to specific methods of compositing the printing ink ingredients, specific components of the ink and to other alternative procedures in the preparation of the varnish vehicle, etc., will be referred to in greater detail in the following further description of the invention.

One of the primary and essential components of the printing ink composition herein provided which distinguishes the product from conventional oxidative drying inks containing only unsaturated fatty acid ester drying oils, known presently to the art, and which lends its distinct properties to the ink to provide a product having the distinguishing and advantageous properties hereinabove noted is a drying oil consisting essentially of a mixture of relatively high molecular weight hydrocarbons, the molecular weight of which are from about 500 to about 5,000, and which contain in their molecular structure poly-olefinic unsaturation, the number of olefinic double bonds contained in the hydrocarbons generally being from about 10 to about 80, depending upon molecular weight and method of preparation, the mixture of hydrocarbons being capable of drying rapidly by atmospheric oxidation to form a tough, hard, resinous film having high rub and scratch resistance. This mixture of hydrocarbons, referred to herein as a copolymer hydrocarbon drying oil, when admixed with or cobodied with an unsaturated fatty acid ester type of drying oil provides the varnish vehicle utilized in the preparation of the present printing ink composition. The preferred drying oil vehicles when considered from the standpoint of tack, viscosity, penetration, rub resistance, scratch resistance and many other properties desired in a typical printing ink composition is the drying oil vehicle prepared by copolymerizing or cobodying a mixture of the unsaturated fatty acid ester drying oil with the copolymer hydrocarbon drying oil.

Copolymer hydrocarbon oils capable of drying upon exposure to atmospheric oxygen to form a tough, resinous, hard film are prepared in the process disclosed in our copending application No. 84,766, filed March 31, 1949, Patent No. 2,582,411. In general, the method comprises copolymerizing a conjugated di-olefinic hydrocarbon containing not more than about eight carbon atoms per molecule with a monoiso-olefin likewise containing not more than about 8 carbon atoms per molecule at a temperature of from about −80° C. to about −20° C., utilizing anhydrous hydrogen fluoride as the polymerization catalyst and charging a quantity of di-olefin to the process of about 60 to about 95% by weight of the combined di- and monoiso-olefins. It is found that at these specific conditions, that is, at the specified temperatures and utilizing the particular ratio of di- and mono-olefin reactants as well as the particular specified catalyst, a liquid copolymer product is obtained which has drying oil properties rather than a solid resinous or plastic product representing a cross polymer of the reactant monomers, normally obtained upon copolymerization of the indicated reactants at higher temperatures, in the presence of other catalysts, and utilizing other reacting ratios than hereinabove specified for production of the liquid product having drying oil properties. The conjugated di-olefin reactant utilized in the preparation of the copolymer hydrocarbon drying oil herein specified preferably contains a terminal methylene group, typical examples of which are such di-olefins as piperylene, butadiene-1,3, isoprene, hexadiene-1,3, 2-methylene-pentadiene-1,3, 3-methylhexadiene-1,3 and others of homologous and analogous series. Typical monoiso-olefinic hydrocarbon reactants, also desirably containing a terminal methylene group and containing not more than about 8 carbon atoms per molecule, are such hydrocarbons as 2-methylbutene-1, 3-methylbutene-1, 2-ethylbutene-1, 3-methylhexene-1 and isomers as well as homologues thereof, the preferred monoiso-olefin being isobutylene (2-methyl propene).

Substantially anhydrous (that is, containing less than about 10% by weight of water) hydrogen fluoride catalyzes the copolymerization of the diolefin and monoiso-olefin reactants at temperatures of from about −80° to about −20° C. to produce the desired liquid hydrocarbon copolymers having drying oil properties. The liquid hydrogen fluoride is introduced into the reaction mixture of diolefin and monoiso-olefin, the latter being preferably dissolved in a low boiling, inert solvent, such as propane, Freon, butane, etc., as a mist or in the form of a vapor diluted with an inert gas such as nitrogen, propane, butane, etc. accompanied by rapid stirring of the reaction mixture to distribute the catalyst as rapidly as possible throughout the reaction mixture as uniformly as possible. The inert diluent of the reactants, and especially the volatile solvent, such as propane, is a desirable addendum to the reaction mixture, not only for the purpose of controlling the rate of reaction by dilution of the reactants but a further advantage is realized in utilizing a volatile diluent in that the reaction temperature is maintained within the desired range by evaporative cooling of the low boiling point diluent as the temperature of the mixture tends to exceed the boiling point of the diluent. This precaution eliminates local high temperature zones within the reaction mixture caused by the highly exothermic copolymerization of the mono- and diolefinic reactants, which, if not eliminated, would tend toward the formation of the high molecular weight, solid cross polymers of the olefinic hydrocarbon reactants. The presence of a diluent in the reaction mixture moderates the rate of reaction by virtue of its dispersing effect on the highly reactive mono and di-olefin charging stocks, thus tending to reduce uncontrolled or too rapid a rate of polymerization.

The reaction mixture following a suitable reaction period, usually from about ½ to about 6 hours in duration, may be quenched at the low temperature maintained during the copolymerization reaction with a solvent for the hydrogen fluoride catalyst or a compound which reacts therewith to reduce its catalytic activity. Substances which thus act in the capacity of quenching agents of the hydrogen fluoride catalyst are collectively referred to as "bases" and may be a neutralizing agent, a diluting agent, or a compound which selectively reacts therewith to form a hydrogen fluoride complex. Compounds which remove the hydrogen fluoride from the reaction mixture but form a product from which the hydrogen fluoride may not be readily separated for recycling purposes are such reagents as water, aqueous solutions of sodium hydroxide, potassium hydroxide, ammonia etc. These react or form an aqueous phase containing the hydrogen fluoride component of the reaction mixture which is thereafter separated from the hydrocarbon components of the reaction mixture, for example by decantation. While such reagents are often convenient and produce a satisfactory hydrocarbon product, the catalyst is not recovered in condition for re-use, except in the case of aqueous hydrogen fluoride from which the anhydrous acid may be distilled in part. Other methods of catalyst removal which circumvent this difficulty are the so-called "quenching" agents capable of forming a heat-decomposable salt or complex with the hydrogen fluoride which may be subsequently separated and treated to recover the hydrogen fluoride therefrom. Certain oxygen-containing organic compounds such as alcohols, esters, ethers, phenols, etc. combine with hydrogen fluoride to form complexes and free the copolymer product. Certain inorganic salts, such as sodium, potassium and lithium fluorides as well as others combine with the hydrogen fluoride to form double salts therewith which likewise are heat-decomposable and from which the hydrogen fluoride may be recovered in an anhydrous condition suitable for recycling. The amines and particularly the high boiling amines, such as aniline, pyridine, quinoline, and others form hydrogen fluoride salts which may be heated to recover not only the organic amine for recycle purposes, but the hydrogen fluoride as well in an anhydrous state for recycle to the polymerization stage of the process. Following the addition of a base or a quenching agent to the polymerization reaction mixture the copolymer product may be separated therefrom by any of several alternative procedures. One of the preferred procedures comprises adding a low boiling point naphtha diluent or other mixture of hydrocarbons containing a large percentage of aromatic hydrocarbons such as benzene, toluene, xylene, etc. to the reaction mixture and separating the resultant phases, the copolymer product dissolving in the addendum solvent. The hydrocarbon phase is thereafter decanted from the remaining reaction mixture and the copolymer product recovered from the separated phase, for example by distillation.

The copolymer product drying oil is a light-colored, viscous mixture of highly unsaturated hydrocarbons containing from about 10 to about 80 non-conjugated olefinic double bonds per molecule and having molecular weights above about 500, up to about 5,000. The oil dries rapidly, especially in the presence of metallic driers, such as cobalt naphthenate, cobalt oleate and other well known drier salts, particularly those of lead and manganese, upon exposure in thin films to atmospheric oxygen. A film of the copolymer oil when subjected to oxidative drying becomes tack-free in less than about 8 hours and dries to a completely non-tacky film in less than about 24 hours to form a coating of extreme hardness (having Sward hardness values of about 50) which are also tough, highly resistant to abrasion, do not discolor upon exposure to ultra-violet radiation, and are moisture and alkali resistant. The copolymer hydrocarbons existing in the product of the copolymerization of a monoisoolefin and a conjugated diolefin at the above reaction conditions are believed to be of relatively straight chain structure having unsaturation and methyl substituents distributed throughout the length of the copolymer molecules in isolated positions. This structure is believed to account for its remarkable film-forming properties and its capacity to dry at high speed upon exposure to atmospheric oxygen.

The unsaturated fatty acid ester drying oils utilized in the preparation of the drying oil vehicle of the present printing ink composition, either in admixture with the unsaturated copolymer hydrocarbon drying oil or cobodied with said copolymer hydrocarbons, are those which occur either naturally as fatty acid glycerides or as the synthetically produced unsaturated fatty esters of other alcohols than glycerol. Such modified esters may be represented for example by the fatty acid esters of methanol, ethanol, and homologous alcohols; the glycols or polymeric glycols, such as a member of the polyethylene glycol series; other polyhydric alcohols, such as pentaerythritol, polyallylalcohol, and 2,2-dimethylolpropanol, or of an unsaturated alcohol, such as butenol. Included in the unsaturated fatty acid ester drying oils contemplated herein are the drying and semi-drying classes. Of these, particularly tung oil, linseed oil, dehydrated castor oil, oiticica oil, perilla oil, soybean oil, hempseed oil, poppyseed oil, safflower oil, walnut oil, sardine oil, etc., are representative oils of the glyceride ester type utilizable herein. Other glyceride oils which are considered to be non-drying, such as olive oil, cottonseed oil and coconut oil, may be utilized in the drying oil composition as plasticizers. The drying oils may be enhanced in their drying properties or other characteristics by subjecting the oil to a suitable solvent extraction procedure or by copolymerization of the oil with such materials as styrene, maleic anhydride, dicyclopentadiene, and the like, the latter processes being well known to those skilled in the art. It is also contemplated herein to utilize the fatty acids themselves derived from the esters, such as the glycerides, for example, and recovered from such esters by hydrolysis. The quantity of fatty acids in the printing ink composition is, however, preferably maintained at below about 10% by weight to minimize the problems of "livering" in which the vehicles tend to separate from the pigments and other solids in the composition when the proportion of fatty acids therein becomes excessive and when reactive pigments are present.

The respective unsaturated fatty acid ester drying oil and unsaturated copolymer hydrocarbon drying oil components of the present vehicle composition are mixed or combined in the proportion of from about 10 to about 90 parts by weight of the unsaturated copolymer hydrocarbon oil to from about 10 to about 90 parts by weight of the unsaturated fatty acid ester drying oil, and preferably in the proportion of from about 90 to about 25 parts by weight of the hydrocarbon oil per 100 parts by weight of the mixture. As heretofore indicated, the drying oils in the vehicle may consist merely of a mixture of the two components, or alternatively, the drying oils may be cobodied prior to the addition thereto of the other components of the drying oil printing ink composition. In the production of the cobodied unsaturated copolymer hydrocarbon and unsaturated fatty acid ester drying oils, comprising one of the alternative vehicles of the present printing ink composition, a mixture of the respective drying oils is stirred while the mixture is heated to a temperature not to exceed about 350° C. for a period of time until the viscosity approaches the desired value, generally from about 8 to about 14 poises. The relative proportion of the respective drying oils is preferably maintained within the above specified proportions during the cobodying reaction. Depending upon the viscosity obtained and ultimately desired of the final printing ink composition, additional quantities of the unsaturated copolymer hydrocarbon drying oil may be added to the cobodied mixture to increase the viscosity of the mixture to the desired value or additional quantities of the fatty ester oil may be added to reduce the viscosity.

The cobodying reaction may also be effected in the presence of certain types of catalysts, generally characterized as acid-acting reagents, such as phosphoric acid, a silica-alumina composite, or a solid phosphoric acid catalyst, formed by calcining a siliceous absorbent such as kieselguhr impregnated with a suitable phosphoric acid, such as orthophosphoric acid, by Friedel-Crafts halide catalysts, including boron trifluoride; or by organic peroxide type catalysts, either added from an external source or generated in situ by aeration of the drying oil.

The printing ink vehicle may contain a resin to provide a true varnish vehicle which adds substance or body, hardness, gloss, and permanency to the film of print obtained in the printing operation utilizing the present ink composition. In the use of certain types of resins, having the properties of elasticity and/or toughness, a printed film is obtained in which these properties are also transferred to the ultimately dried ink composition film, thus providing a film which may be fixed without checking or cracking, particularly in the case of relatively thick or heavy film prints obtained, for example, by the intaglio printing process or obtained when smooth-surfaced, hard and non-absorbent surfaces are printed with the printing ink composition. Suitable resins for incorporation into the varnish vehicle include such typical classes as the natural resins, for example, rosin, copal, kauri, dammar, elemi, rubber, etc. and the various synthetic types of resins, such as the phenol-formaldehyde resins, ester gum, petroleum resins, obtained as nondistillable residues of petroleum fractions, chlorinated rubber, the alkyd resins, such as the oil-modified phthalic acid-polyol condensation products, urea-formaldehyde, maleic anhydride resins, coumarone-indene resins, polyisobutylene, the terpene hydrocarbon resins, and others compatible with the drying oil vehicle component of the varnish. The presence of the hydrocarbon drying oil component in the present vehicle greatly increases the number and variety of resins utilizable in the present printing ink composition, and extends the number of resins compatible with the drying oil vehicle because of the solubilizing action of the hydrocarbons on many resins otherwise insoluble in a vehicle consisting only of a fatty acid ester drying oil. The above cited examples of suitable resins utilizable in the composition are not exclusive of other types and the quantity incorporated into the composition may be varied within wide limits depending upon the particular resin being considered and the properties of the ultimate film desired, as well as the conditions of printing and the type of printing process utilized. The amount of resin incorporated into the vehicle is generally within the range of from 5 to about 50%, preferably from about 5 to about 30% by weight of the finished varnish.

Another type of resinous drying oil material which may advantageously be incorporated with the copolymer hydrocarbon drying oil herein described is the so-called conjunct polymer recoverable from the catalyst phase of hydrocarbon reactions carried out in the presence of conjunct polymerization catalysts such as, for example, hydrogen fluoride, sulfuric acid, aluminum chloride, and other Friedel-Crafts metal halides. The hydrocarbons so recovered (as described, for example in U. S. Patent No. 2,476,955) are generally cyclic polyolefines rich in conjugated unsaturation, which upon exposure to air dry to hard but brittle resinous films. A blend of the non-viscous fractions of the conjunct polymer oil with the relatively viscous copolymer hydrocarbon drying oil herein described permits the formulation of a fast-drying mixture of the viscosity useful in printing inks and of excellent water and alkali-resistance because it is completely hydrocarbon in nature and lacking in ester groups.

Other ingredients which have a resinifying action upon the ultimate printed film and increase the tack of the ink, especially where black or dark colored prints are desired, are the asphalts and asphaltenes, such as gilsonite, grahamite, pitch, the petroleum asphalts, etc., and the latter are preferably dissolved in the hydrocarbon drying oil prior to incorporation with the other ingredients of the ink composition.

If utilized in printing ink compositions, the resin is desirably composited with the drying oil components to provide a vehicle or varnish prior to incorporation of the other ink ingredients. For this purpose, the resin in solid form, usually in small particles, or ground to a powdered form, is added gradually, with stirring, to either or both of the drying oils or to a cobodied mixture thereof. The resin may also be dissolved in a naphtha solvent, for example, or in a wax or a high molecular weight alcohol, and the resulting resin-solution added to the drying oils where such additional components are desired in the ink composition for the purpose of introducing specific properties into the composition. In order to intimately dissolve and disperse the resin throughout the drying oil, the latter is heated in a conventional varnish kettle to a temperature of from about 100° to about 300° C. and the resin stirred into the drying oil at this temperature. The resulting mixture is maintained at this temperature for a period determined by the ultimate viscosity desired, usually within the range of from about 8 to 14 poises at 25° C., although the viscosity of the unthinned varnish may be greater or less than the above specified range, depending upon whether a naphtha solvent is to be incorporated into the printing ink. Thus, the varnish may be heated or bodied until a specific viscosity is obtained, and the latter decreased by addition thereto of a naphtha diluent when the varnish has cooled. It is also to be noted that the quantity of resin incorporated into the varnish determines its viscosity, which factor is ultimately fixed by the physical properties required for the particular ink desired, for the particular use to which the ink is to be applied and the printing process in which the ink is utilized.

The present printing ink composition may optionally contain one or more pigments and toners depending upon the intended use of the ink. In the production of a black printing ink, carbon black, lamp black, and vegetable blacks are the most widely used pigments for this purpose, although organic dyes, such as nigrosine black and aniline black may be utilized to advantage either separately or in conjunction with the use of carbon black. Certain organic pigments which intensify or modify the color of another pigment in the composition, referred to as toners, may also be added to the ink composition to obtain desired coloring effects. Such toners as Induline Blue and Methyl Violet are utilized especially in printing inks in which carbon black is the primary pigment, the toner preferably being added to the composition dissolved in a fatty acid, such as oleic acid. Other pigments such as vermilion, Venetian red, chrome yellow, chrome green, lithopone, titanium dioxide, etc. may also be utilized for printing inks of specific colors. The quantity of pigment in the ink composition is generally from about 10 to about 40% by weight of the product, the higher the concentration of pigment, in general, the greater being the density and opacity of the printed film. Where intensity of color is not an important factor or a particular requirement of the printing ink, a class of materials known as "extenders" may be incorporated into the present printing ink composition for increasing the quantity of ink available from a given quantity of vehicle or to develop certain physical properties desired of the ink, such as body and texture. When utilized, the extender replaces a portion of the pigment component in the composition and may be selected from the relatively large group of materials known to the printing ink art for such purposes, such as kaolin, alumina, barium sulfate, magnesium carbonate, and other substances, preferably in a finely divided condition.

The present printing ink composition may also contain a so-called "drier" or "siccative" component to accelerate the oxidation-polymerization reactions involved in the drying of the printed film when it is exposed to atmospheric oxidation in common with oxidative drying type printing ink compositions of the prior art. These compounds which are usually in the form of metallic salts of carboxylic acids or in the form of metallic oxides reduce the drying time by substantially eliminating the induction period noted in the conversion of pure drying oil films to a solid, resinous film, obtained when the oil is completely dried. Such driers as cobalt, nickel, manganese, cerium, and iron naphthanates, oleates, linoleates, resinates, etc. and oxides, such as lead oxide in finely powdered form dispersed in the composition or dissolved in the vehicle are effective in the present printing ink composition in amounts of from about 0.1 to about 1% by weight thereof. The cobalt salts, such as cobalt naphthenate, constitute one of the preferred groups of drier salts in the present composition. The drier salt is preferably dissolved in the drying oil vehicle or ground together with the solid components of the composition prior to admixing all of the ingredients.

In order to enhance the dispersion of the pigment and other solid components in the vehicle and to increase the wetting action of the ink on the printed article, a wetting agent, in amounts of from about 0.05 to about 2 to 3% may be incorporated into the composition, especially in those instances where the pigment does not readily mix with the vehicle due to the inability of the drying oil to wet the pigment. Suitable wetting agents include certain carboxylic acid and sulfonic acid derivatives of organic compounds and certain metallic salts, or esters thereof. The mahogany sulfonic acid salts and the Turkey-red oils and certain long chain alcohol sulfates, such as lauryl sulfate, olefinic and aromatic sulfonates, such as sodium dodecyltoluene sulfonate, carboxylic acids and their salts, such as lead oleate, may be utilized, as well as naturally occurring but weaker wetting agents such as, for example, pine oil. In general, it is preferred to mix the wetting agent with the liquid vehicle prior to admixing the pigment, toner, extender, and other solid ingredients with the vehicle.

The incorporation of various ingredients into the printing ink composition is effected by means of an efficient mixing or stirring device to intimately disperse and/or dissolve the various solid components into the vehicle previously prepared. For this purpose, various types of mixers are in present common use by the printing ink manufacturing art such as Buhrstone mills, colloid mills, roller mills, etc. which not only reduce the solid components to a finely divided form but uniformly disperse the finely divided particles throughout the composition. During the grinding or milling operation, water may be incorporated into the printing ink to provide a typical emulsion type printing ink composition, especially in the presence of a water-soluble wetting or dispersing agent of the type hereinbefore noted. The preferred water-in-oil emulsion printing inks have water contents of from about 15 to about 50% by weight of the total composition. The preferred water-in-oil type emulsion inks are formed by dispersing the water into the previously formed vehicle-pigment composition. The mixing of phases or emulsion-forming is effected during the final grinding or milling operation. The emulsifying or wetting agent utilized to promote the emulsification may be added either to the vehicle-pigment composition or dissolved in the aqueous phase prior to emulsification.

The following examples illustrate the preparation of printing ink vehicles containing the novel unsaturated copolymer hydrocarbon and fatty acid ester drying oils, the incorporation of said vehicles into specific printing ink compositions, and describe the properties of the ultimate printing ink composition in relation to properties desired by commercial printers for inks of optimum printing qualities. The examples, however, are not intended to be construed as limitations of the generally broad scope of the invention herein provided.

EXAMPLE I

*Preparation of unsaturated copolymer hydrocarbon drying oil*

A hydrocarbon drying oil copolymer of butadiene and isobutylene was prepared in the following experiment using hydrogen fluoride vapor as the catalyst. 78.9 grams of butadiene and 9.8 grams of isobutylene were dissolved in 140 grams of liquid propane maintained in liquid phase by the addition of "dry ice" to the above hydrocarbons, and 12 grams of hydrogen fluoride vapor were gradually added to the reactants as the latter were vigorously stirred. The hydrogen fluoride vapor was introduced into the reaction mixture immediately above the surface of the stirred mixture and was allowed to enter the liquid phase by absorption through the surface. Additional dry ice was added to the reaction mixture as the exothermic heat of the resulting copolymerization reaction vaporized the carbon dioxide, thus maintaining the reaction temperature at approximately −76° C. throughout the reaction. The mixture was stirred an additional 3 hours at the above temperature and the reaction then terminated by the addition of dilute sodium hydroxide to the mixture. Benzene was then introduced to the reaction mixture to form a more fluid two phase mixture from which the upper, benzene-containing phase was decanted from the lower aqueous phase. The benzene component was distilled from the mixture, leaving a viscous, lightly colored liquid having an apparent bromine number of approximately 101 and an approximate molecular weight by cryoscopic means of determination of approximately 980. The oil, when spread as a thin film and exposed to atmospheric oxygen, dried to a tack-free film in less than 24 hours which reached a Sward hardness of aproximately 47. The dried film, although relatively hard, was comparatively brittle relative to dried films obtained by oxidative drying of fatty acid glyceride drying oils. The synthetic oil was accordingly mixed with the ester drying oil to obtain vehicles capable of drying to a film of a lesser degree of brittleness.

*Preparation of printing ink vehicle*

The synthetic hydrocarbon drying oil prepared as indicated above was mixed with such unsaturated fatty acid glyceride drying oils as linseed and tung oil to provide printing ink vehicles having a viscosity of approximately 11 poises. The vehicle for printing ink composition I consisted of a uniform blend of 35.5 percent alkali refined linseed oil and 64.5 percent synthetic hydrocarbon drying oil. The vehicle for printing ink composition II consisted of a mixture of 5 percent alkali refined linseed oil, 29.5 percent tung oil and 65.5 percent synthetic hydrocarbon drying oil.

A printing ink vehicle consisting of No. 0 bodied linseed oil (viscosity, 11 poises) was prepared as a standard for comparison with the ink vehicles provided by the present invention. The standard vehicle is considered as representative of presently known oxidative type printing ink vehicles now utilized in conventional printing ink compositions of the art.

EXAMPLE II

Printing ink compositions were prepared from the drying oil vehicles described in Example I and the properties determined and compared with the standard ink compositions prepared from the standard bodied linseed oil vehicle. The respective printing inks were then utilized in a printing operation, employing a conventional printing press (Vandercook Proving Press) in which the printing plate (a rotating impression cylinder) containing both solid and half tone areas was uniformly inked over its entire surface with each of the inks subjected to the test. The inks were printed upon several representative types of paper, including: (1) an English finish paper (or machine finish paper) made from sulphite pulp, the surface of which was filled with a white pigment, (2) a super-calendered paper (same as English paper finished by friction calender rolls to provide a substantially non-absorbent paper), and (3) a coated paper containing a coating of clay casein calendered to a smooth, high finish. Each ink was evaluated on the basis of the properties described below and compared with a formulation containing the standard vehicle:

*Flow.*—10 grams of the ink were scraped into a mound about ½″ high on a glass plate and the time required for the material to level into a pool was determined, a leveling time of 1 minute indicating good flow.

*Tack.*—A qualitative test was made by rubbing a small quantity of the ink into a very thin film, using the middle finger to measure the pull resistance as compared to the standard ink composition.

*Drying qualities.*—A section of a solid printed area was rubbed with the middle finger, using considerable pressure and noting the amount of ink smeared onto the white area next to the printed area.

*Printing quality.*—The ability of the ink to print a dense, black, solid film without filling in the half tone areas on the printed paper was noted, an inferior ink completely filling in the half tone areas to a solid film.

*Scratch resistance.*—The back of the finger nail is slid across the half tone areas of the sheet, the darker the line appearing on the sheet, the poorer the rating of the ink as to scratch resistance.

*Rub resistance.*—A 2″ wide strip of paper under a 100 gram weight was pulled across the solid area of the print and the degree of burnishing on the printed film was noted, as well as the quantity of ink transferred to the paper strip.

*Penetration.*—The degree of darkness appearing on the backside of the printed paper was noted, especially for the absorbent type of printing paper, such as an English finish paper.

*Printing ink compositions*

Printing ink formulations utilized as samples in the following evaluations were prepared for comparative tests, utilizing the standard testing procedures hereinabove described. Each sample of printing ink was prepared by a uniform procedure for each of the vehicles subjected to the test. This procedure was as follows:

Each of the drying oil vehicles was reduced to a standard 11 poise viscosity, where necessary, by the addition of a petroleum naphtha solvent (Apco deodorized solvent #467) and the resulting vehicle mixed with carbon black (Peerless Brand Channel Black) by grinding 70 grams of the vehicle with 20 grams of the carbon black on a 3-roller mill. The resulting dispersion of vehicle and carbon black was then ground on the 3-roller mill with 5 grams of Methyl-Violet toner ink, 5 grams of Iron Blue ink and 8 grams of cobalt ink drier (cobalt naphthenate, 6% Co).

The following table is a tabulation of the printing results of the various testing procedures to which the printing ink compositions were subjected:

Table I

PHYSICAL TEST COMPARISON OF INK COMPOSITIONS CONTAINING SYNTHETIC HYDROCARBON COPOLYMER DRYING OIL AND A STANDARD CONTAINING LINSEED OIL DRYING OIL VEHICLE

| Printing Ink Composition No. | Rating [1] | | | | | | |
|---|---|---|---|---|---|---|---|
| | Flow | Tack | Printing | Drying | Scratch Resist. | Rub Resist. | Penetration |
| I | − | 0 | 0 | ++ | ++ | ++ | [2] − |
| II | 0 | + | 0 | ++ | ++ | ++ | [2] − |
| III (St'd) | 0 | 0 | 0 | 0 | 0 | 0 | 0 |

[1] Code:
++ Much better than standard.
+ Better than standard.
0 Equal to standard.
− Slightly worse than standard.
[2] Tested on English finish paper; 0 to + on calendered and coated paper.

We claim as our invention:

1. A printing ink composition comprising a pigment and, as a vehicle for the pigment, a mixture of an unsaturated fatty acid glyceride drying oil and a hydrocarbon drying oil consisting essentially of polyolefinic, high molecular weight hydrocarbons formed by the hydrogen fluoride catalyzed copolymerization, at a temperature of from about −80° C. to about −20° C., of a mixture of from about 60 to about 95% by weight of an aliphatic conjugated diolefin of not more than 8 carbon atoms and from about 40 to about 5% by weight of an aliphatic isomono-olefin of not more than 8 carbon atoms.

2. A printing ink composition comprising a pigment and a varnish vehicle consisting of a mixture of from about 10 to about 75 parts by weight of an unsaturated fatty acid ester drying oil and from about 90 to about 25 parts by weight of an aliphatic, polyolefinic hydrocarbon drying oil having a molecular weight of from about 500 to about 5000, containing from about 10 to about 80 double bonds per molecule and formed by the hydrogen fluoride catalyzed copolymerization, at a temperature of from about −80° C. to about −20° C., of a mixture of from about 60 to about 95% by weight of an aliphatic conjugated diolefin of not more than 8 carbon atoms and from about 40 to about 5% by weight of an aliphatic isomono-olefin of not more than 8 carbon atoms.

3. The composition of claim 1 further characterized in that said glyceride drying oil is tung oil.

4. The composition of claim 1 further characterized in that said glyceride drying oil is linseed oil.

5. The composition of claim 1 further characterized in that said diolefin and isomono-olefin are, respectively, butadiene-1,3 and isobutylene.

6. As a varnish vehicle suitable for printing ink compositions, a mixture of an unsaturated fatty acid glyceride drying oil and a hydrocarbon drying oil consisting essentially of polyolefinic, high molecular weight hydrocarbons formed by the hydrogen fluoride catalyzed copolymerization, at a temperature of from about −80° C. to about −20° C., of a mixture of from about 60 to about 95% by weight of an aliphatic conjugated diolefin of not more than 8 carbon atoms and from about 40 to about 5% by weight of an aliphatic isomono-olefin of not more than 8 carbon atoms.

7. The composition of claim 6 further characterized in that the varnish vehicle contains a resin soluble in said hydrocarbon drying oil.

8. As a varnish vehicle suitable for printing ink compositions, a liquid having a viscosity of from about 8 to about 14 poises at 20° C. and consisting of a mixture of from about 10 to about 75 parts by weight of an unsaturated fatty acid ester drying oil and from about 90 to about 25 parts by weight of an aliphatic, polyolefinic hydrocarbon drying oil having a molecular weight of from about 500 to about 5000, containing from about 10 to about 80 double bonds per molecule and formed by the hydrogen fluoride catalyzed copolymerization, at a temperature of from about −80° C. to about −20° C., of a mixture of from about 60 to about 95% by weight of an aliphatic conjugated diolefin of not more than 8 carbon atoms and from about 40 to about 5% by weight of an aliphatic isomono-olefin of not more than 8 carbon atoms.

HERMAN S. BLOCH.
ALFRED E. HOFFMAN.

References Cited in the file of this patent

UNITED STATES PATENTS

| Number | Name | Date |
|---|---|---|
| 2,092,889 | Mikeska | Sept. 14, 1937 |
| 2,135,976 | Koenig | Nov. 8, 1938 |
| 2,265,639 | Forman | Dec. 9, 1941 |
| 2,470,894 | Johnstone | May 24, 1949 |

FOREIGN PATENTS

| Number | Country | Date |
|---|---|---|
| 821,944 | France | May 18, 1937 |

OTHER REFERENCES

Smith et al.: Am. Ink Maker, Dec. 1947, pages 29, 31 and 33.